United States Patent [19]

Wilson

[11] Patent Number: 4,612,739
[45] Date of Patent: * Sep. 23, 1986

[54] LOW PRESSURE VENTING PANEL

[75] Inventor: Bryce H. Wilson, Kansas City, Mo.

[73] Assignee: Continental Disc Corporation, Kansas City, Mo.

[*] Notice: The portion of the term of this patent subsequent to Feb. 12, 2002 has been disclaimed.

[21] Appl. No.: 700,688

[22] Filed: Feb. 11, 1985

Related U.S. Application Data

[63] Continuation-in-part of Ser. No. 328,189, Dec. 7, 1982, Pat. No. 4,498,261.

[51] Int. Cl.$^4$ .................. B65D 25/00; F16K 17/40
[52] U.S. Cl. .................................. 52/1; 52/98; 52/208; 220/89 A; 137/68.1
[58] Field of Search .............. 52/1, 98, 99, 208, 200; 220/89 A; 137/68 R

[56] References Cited

U.S. PATENT DOCUMENTS

| | | | |
|---|---|---|---|
| 1,930,138 | 10/1933 | Van Derhoef . | |
| 2,095,828 | 10/1937 | Nerad . | |
| 2,276,830 | 3/1942 | Doran . | |
| 2,358,143 | 9/1944 | Castor . | |
| 2,697,467 | 5/1954 | Sherts . | |
| 2,721,157 | 9/1955 | Martin et al. . | |
| 2,922,544 | 1/1960 | Hibbard et al. . | |
| 2,953,279 | 9/1960 | Coffman . | |
| 2,980,286 | 4/1961 | Coffman | 220/89 A |
| 3,072,288 | 1/1963 | Lemmer . | |
| 3,087,645 | 4/1963 | Smirra . | |
| 3,091,359 | 5/1963 | Wood . | |
| 3,109,553 | 11/1963 | Fike et al. . | |
| 3,109,554 | 11/1963 | Porter et al. . | |
| 3,121,509 | 2/1964 | Porter . | |
| 3,169,658 | 2/1965 | Porter . | |
| 3,182,855 | 5/1965 | Stock . | |
| 3,308,586 | 3/1967 | Olson . | |
| 3,319,520 | 5/1967 | Stefano et al. . | |
| 3,363,801 | 1/1968 | Fike . | |
| 3,370,745 | 2/1968 | Parkes et al. . | |
| 3,384,262 | 5/1968 | Fritsche . | |
| 3,386,215 | 6/1968 | Wendel et al. . | |
| 3,445,032 | 5/1969 | Raidl, Jr. et al. | 220/89 A |
| 3,612,345 | 10/1971 | Fike, Jr. | 220/89 A |
| 3,698,598 | 10/1972 | Wood et al. | 220/89 A |
| 3,704,807 | 12/1972 | Lidgard | 220/89 A |
| 3,722,734 | 3/1973 | Raidl, Jr. | 220/89 A |
| 3,775,915 | 12/1973 | Chambers et al. | 52/1 |
| 3,807,106 | 4/1974 | Reinhardt et al. | 52/1 X |
| 3,828,493 | 8/1974 | Vezmar | 52/1 |
| 3,881,629 | 5/1975 | Shaw et al. | 220/89 A |
| 4,027,436 | 6/1977 | Daly | 52/1 |
| 4,050,204 | 9/1977 | Scott | 52/1 X |
| 4,067,154 | 1/1978 | Fike, Jr. | 52/99 |
| 4,072,160 | 2/1978 | Hansen | 220/89 A X |
| 4,079,854 | 3/1978 | Shaw et al. | 220/89 A |
| 4,094,108 | 6/1978 | Scott | 52/1 |
| 4,119,236 | 10/1978 | Shaw et al. | 220/89 A |
| 4,176,503 | 12/1979 | Ting | 52/1 |
| 4,207,913 | 6/1980 | Fike, Jr. | 220/89 A |
| 4,278,181 | 7/1981 | Wood et al. | 220/89 A |
| 4,315,575 | 2/1982 | Schwartz et al. | 220/89 A |
| 4,342,988 | 8/1982 | Thompson et al. | 220/89 A X |
| 4,498,261 | 2/1985 | Wilson et al. | 52/1 |

FOREIGN PATENT DOCUMENTS

| | | | |
|---|---|---|---|
| 736229 | 9/1955 | United Kingdom | 220/89 A |
| 748953 | 5/1956 | United Kingdom | 220/89 A |
| 848892 | 9/1960 | United Kingdom | 220/89 A |

Primary Examiner—J. Karl Bell
Attorney, Agent, or Firm—Litman, Day and McMahon

[57] ABSTRACT

A low pressure venting panel acts to safely vent a pressure vessel, such as a bag house, from overpressure conditions. The venting panel is particularly responsive and predictable at low pressures. The panel includes a thin rupture body with a central group of apertures and slit lines emanating from the apertures. A thin sealing membrane is bonded to one surface of the rupture body at least in the area of the slits. The characteristics of the sealing membrane enable the membrane to resist expansion in the area of the slits when pressure is applied to the rupture body, thereby resisting rupture of the membrane up to the design rupture limit of the venting panel. Various aperture patterns in the center of the rupture body are provided to facilitate predictable opening. The slits are divided into segments connected by bridges to help prevent the slits from separating and the sealing membrane from creeping through the slits prior to rupture. Protective strips adjacent the slits are positioned between the rupture body and the sealing membrane to reduce creep of the membrane through the slits prior to rupture. A vacuum support grid is provided for the panel to support the sealing membrane against a vacuum acting thereon opposite the rupture body.

14 Claims, 9 Drawing Figures

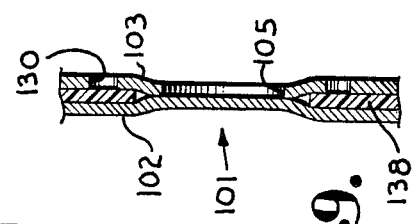
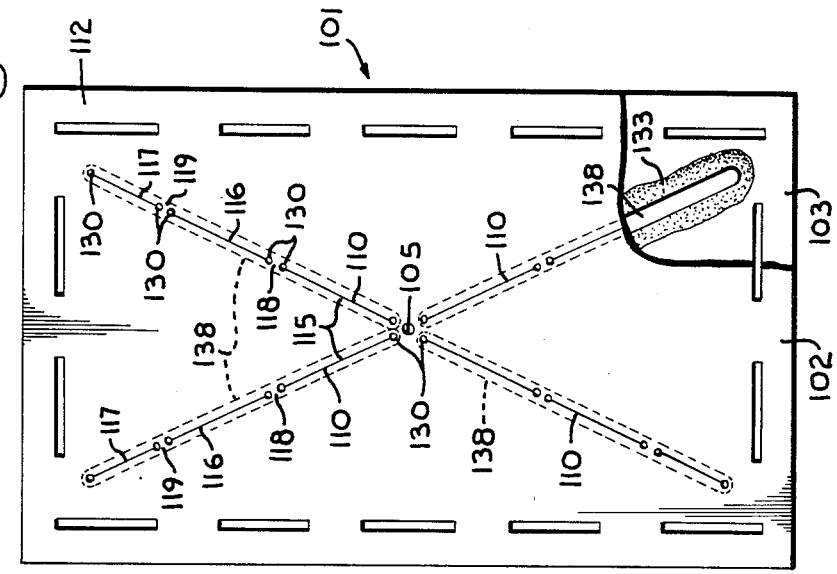
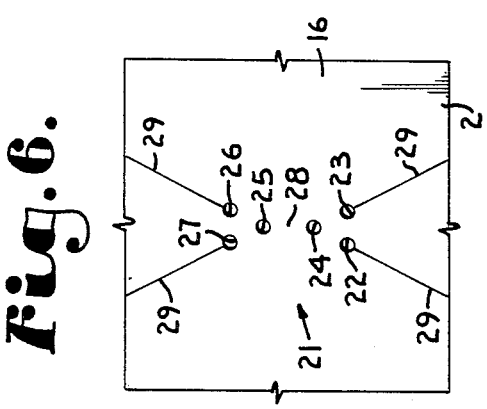
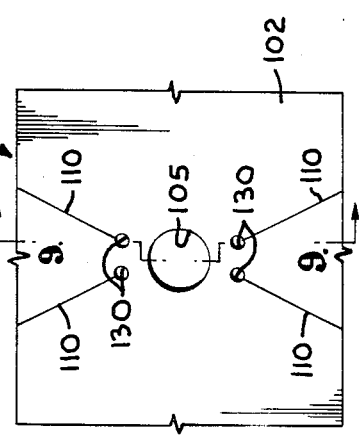
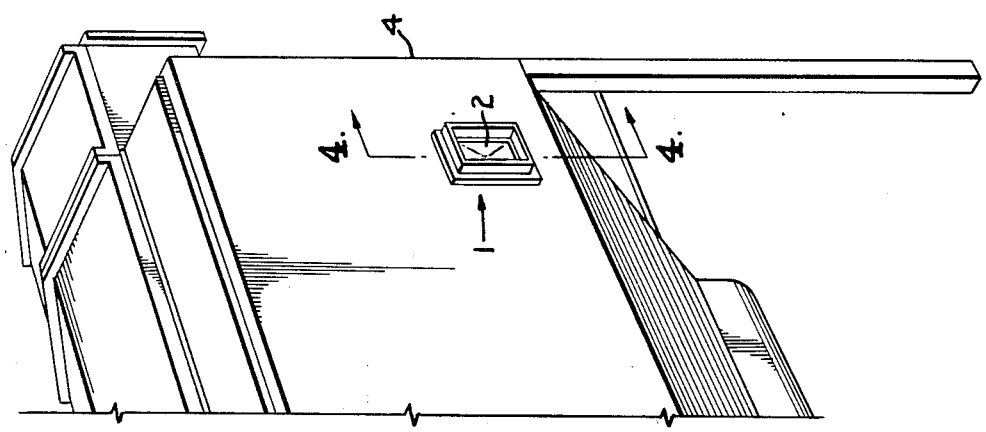

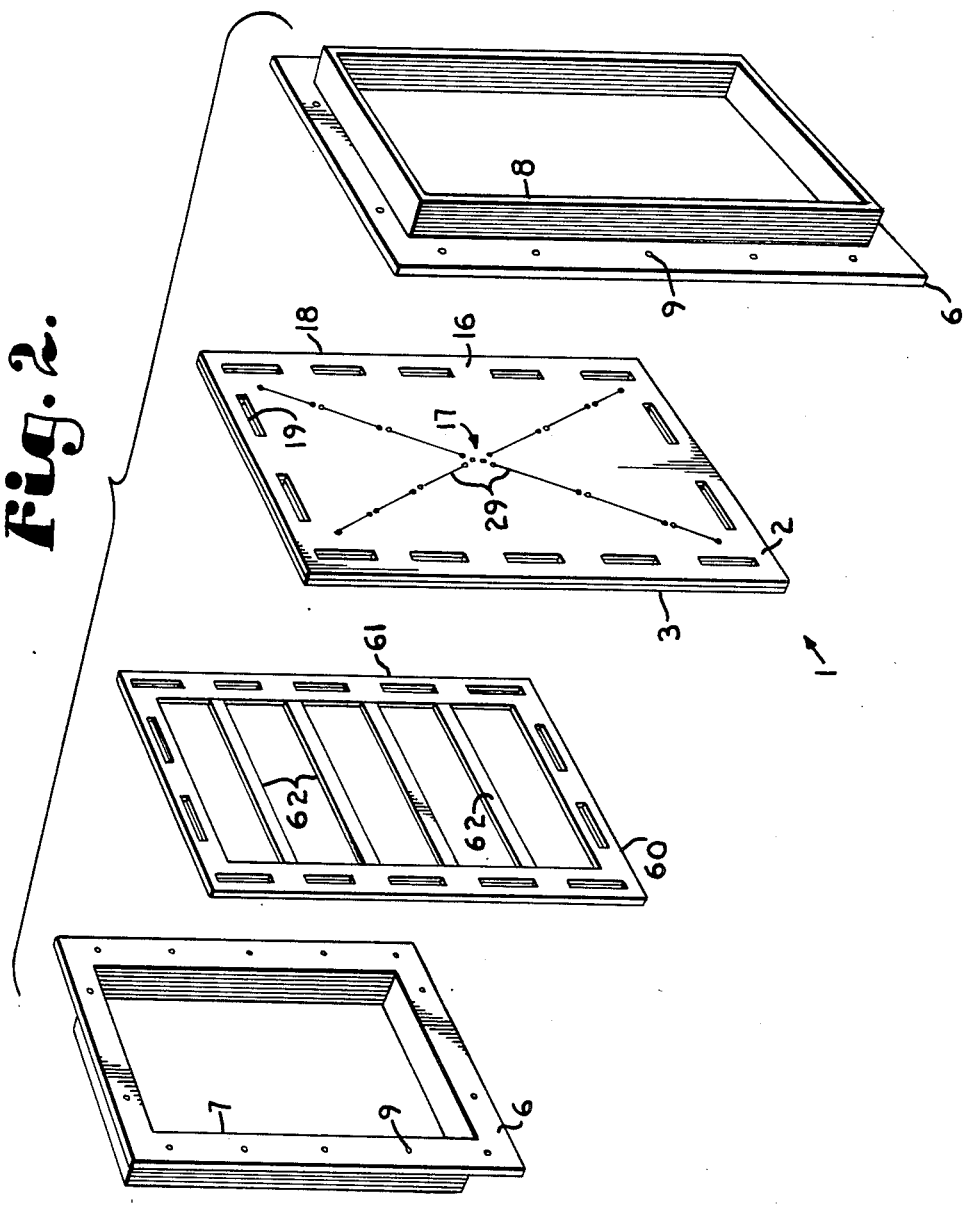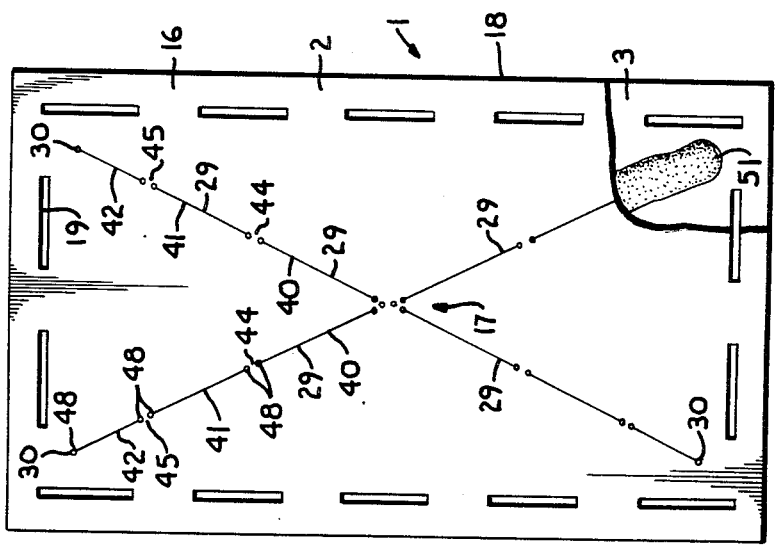

LOW PRESSURE VENTING PANEL

CROSS-REFERENCE TO RELATED APPLICATION

The present application is a continuation-in-part of of a co-pending application entitled LOW PRESSURE VENTING PANEL, Ser. No. 328,189 filed Dec. 7, 1982 now U.S. Pat. No. 4,498,261, of which applicant Bryce H. Wilson was a joint inventor.

BACKGROUND OF THE INVENTION

Low pressure venting panels in accordance with the present invention are often used in conjunction with dust collecting equipment such as bag houses employed to collect milling dust and the like. Such bag houses are subject to the risk of explosion inherent in dust collection and several such catastrophic explosions occur annually in the United States. Bag houses and the like are generally not rigidly constructed and are unable to withstand the force of uncontrolled explosions. Thus, vessels such as bag houses require pressure release safety devices which rupture at relatively low pressure yet predictably rupture so as not to undesirably vent dust into the atmosphere and possibly result in air pollution.

Early devices for providing vent openings in bag houses and the like include burstable membranes or panels of various types, such as roofing paper, cloth, plastic and metal foils. Some membranes or panels are scored to provide lines of weakness; however, reliability, predictability of burst pressure and adequate opening for proper venting was often unsatisfactory.

In other applications requiring a predictable low pressure venting, gaseous processes in large tanks are often subject to explosion or failure. Such tanks are often expensive, the process expensive, and relief devices must be effective and predictable in operation at low pressures. In an effort to provide predicable low pressure rupture panels or discs, two designs have been heretofore developed. A first rupture disc design is termed a composite disc and utilizes a thin floating flexible sealing member in conjunction with a slotted metal member. Here the sealing member is connected to the metal member by its edges but acts independently of the metal member during use. This design has been subject to poor cycling life, relatively inaccurate burst pressures and fragmentation which may clog downstream conduits or provide shrapnel-like projectiles upon violent rupture. Composite discs typically have a central burst point aperture and cut slots or holes to ensure opening in the form of leaves and lack of fragmentation.

A thin very flexible sealing membrane is typically disposed beneath a metal top section. The mechanics of rupture involve swinging out of the metal top section until the thin flexible seal expands uncontrollably and rips open in an undefined tear line. One inherent design deficiency in this type of disc is that the slots in the metal top section greatly weaken the metal and cause the top section to be quite flimsy and move up and down in response to process pressure pulsations. This cycling movement induces fatigue and greatly reduces useful life. The addition of a vacuum support or backing member has done little to alleviate fatigue in the metal sheet.

Further, the use of an independent flexible membrane creates additional problems. The seal tends to creep through the slots in the metal top section when the disc is under pressure. This permits the membrane to balloon and rupture at undesired pressures. Additionally, the pressure of an independent sealing membrane on the metal top section may cause a bulging in the metal top section and an undesired stress on the slots or slits cut in the metal top section which are present to facilitate rupture. This stress may cause the metal top section to deform or to rupture at unpredicted pressures.

A second design of low pressure rupture discs, as is disclosed in the Fike U.S. Pat. No. 4,067,154, uses a solid piece of metal with taped lines and a flexible coating. The burst pressure is determined by the thickness of the metal and the thickness of and type of coating. The tape defines sharp-breaking, shear burst lines to the panel. However, this design is also often believed to yield relatively inaccurate and difficult to predict burst pressures at relatively low bursting pressures. Further, this disc also experiences cycling problems which lead to metal fatigue and premature failure.

The low pressure venting panel of the present invention preferably includes a thin rupture body having a central group of apertures and slits through the body emanating from or from near one or more of the or apertures. A sealing membrane of semi-elastic or relatively inflexible material is bonded to the rupture body at in the area of the slits. This creates a laminated structure which resists expansion in the area of the slits when pressure is applied to the rupture body. Thus, the rupture body resists rupture up to the design limit of the venting panel. The particular venting panel disclosed herein utilizes particular patterns of slits and apertures which have been shown to yield a highly predicable rupture panel. That is, the rupture limit of the venting panel can be predicted in advance and controlled, and the panels can be manufactured with a high degree of certainty as to their rupture limit. It is also desirable in low pressure vent panels to ensure that the panel opens entirely rather than just one of several petals opening. The vent panels of the present application are designed to facilitate full opening of the panel during a typical rupture.

OBJECTS OF THE INVENTION

The principal objects of the present invention are: to provide a venting panel which does not fragment upon bursting; to provide such a venting panel which bursts predictably at a pre-selected pressure; to provide such a panel which bursts at a relatively low pressure; to provide such a venting panel which has highly predictable opening characteristics; to provide such a panel which has quick opening response; to provide such a venting panel which is burstable at low positive or negative pressure; to provide such a panel which may be constructed of relatively large sizes for quickly releasing pressurized fluids from large structures; to provide such a panel which is relatively flat in configuration, thereby permitting ease of handling and ease of use; and to provide such a venting panel which is relatively inexpensive, has a relatively long cyclical life without failure from fatigue and permits a relatively high degree of versatility and design variations to enable use in connection with various vessels and structures.

Other objects and advantages of this invention will become apparent from the following description taken in conjunction with the accompanying drawings wherein are set forth, by way of illustration and example, certain embodiments of this invention.

SUMMARY OF THE INVENTION

A low pressure venting panel is provided for relieving pressure built up in bag houses and the like. The venting panel is preferably relatively flat in operation and rectangular in configuration. The panel has a laminated structure consisting of flexible sealing membrane adhesively bonded to a rigid rupture body. The rupture body has a pattern of slits and apertures in it which provide for a predictable rupturing of the rupture body under pressure. As used herein a slit is a relatively narrow elongate opening which is substantially longer than wide. While the sides of the slit need not always touch, the sides must be sufficiently close to prevent creep of the sealing membrane therethrough when pressure is applied to the membrane. The flexible membrane is laminated to the rupture body in particular in the area of the slits and apertures and may be laminated across the entire surface of the rupture body. The lamination helps prevent creep of the flexible body through the slits and apertures at normal operating pressures and prevents a bulging type stress from being placed on the slits which may cause deformation of the rupture body under normal operating pressures or fatigue in the rupture body which would tend to cause rupturing an unpredicted and undesired pressures.

The particular pattern of slits and apertures disclosed herein provide for a highly predicable pressure bursting and bursting pattern. When rupture does occur, the panel bursts into four leaves each of which hinges open allowing for rapid depressurization of the bag house or vessel involved. The outer periphery of the venting panel may have a series of slots in it which provide for a hinge like opening of the leaves of the venting panel.

The particular venting panel disclosed herein undergoes very little bulging prior to rupture. This is a particular feature of the laminate structure. Thus, the panel may be made flat, and will retain a generally flat configuration during use, often bulging less than one-half inch in the center compared to the sides even near rupture pressure in a panel forty inches long. This facilitates ease of manufacture, ease of handling, and ease of use.

The laminate structure also provides for a very strong panel which resists deformation prior to the rupture limit of the panel. Thus, the panel has a relatively long useful life.

In order to improve bursting reliability while reducing the possibility of creep of the sealing flexible membrane through the through the slits, a system of bridges and slit reinforcing strips are utilized.

The drawings constitute a part of this specification and include exemplary embodiments of the present invention and illustrate various objects and features thereof.

BRIEF DESCRIPTION OF THE DRAWINGS

FIG. 1 is a perspective view of a pressure containing chamber having a vent panel therein embodying the present invention.

FIG. 2 is an enlarged, exploded and perspective view of the vent panel.

FIG. 3 is an enlarged and fragmentary top plan view of the venting panel with portions broken away to show detail thereof.

FIG. 6 is a fragmentary and greatly enlarged top plan view of the vent panel.

FIG. 7 is a top plan view of a modified vent panel according to the present invention.

FIG. 8 is a fragmentary and greatly enlarged top plan view of the modified vent panel.

FIG. 9 is an enlarged cross-sectional view taken along line 9—9 of FIG. 8.

DETAILED DESCRIPTION OF THE PREFERRED EMBODIMENT

Figure 5:
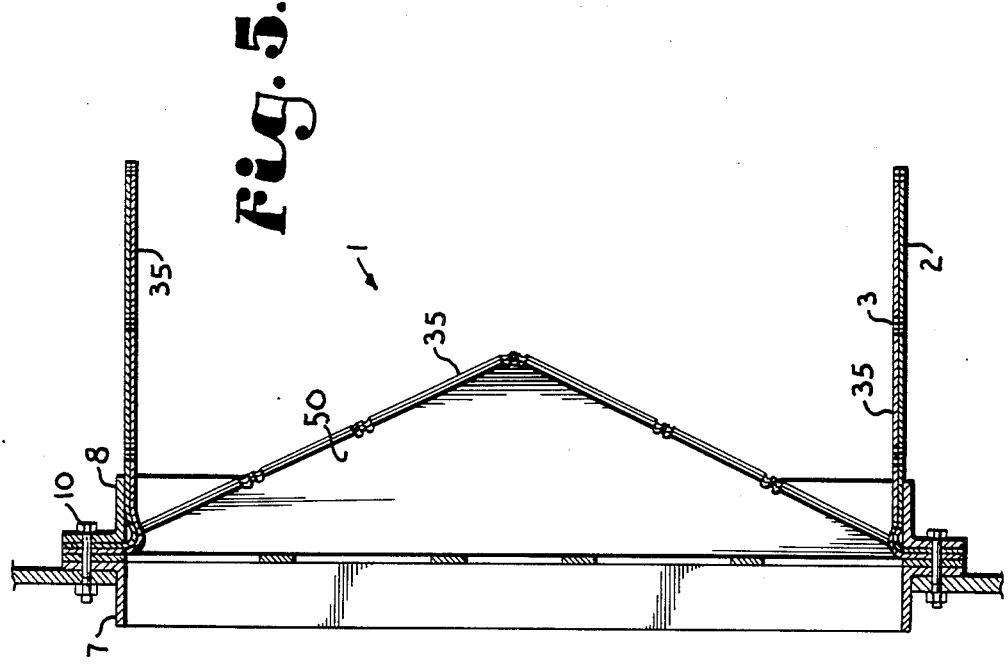
FIG. 5 is an enlarged, cross-sectional view of the vent panel similar to FIG. 4 except after rupture thereof.
Figure 4:
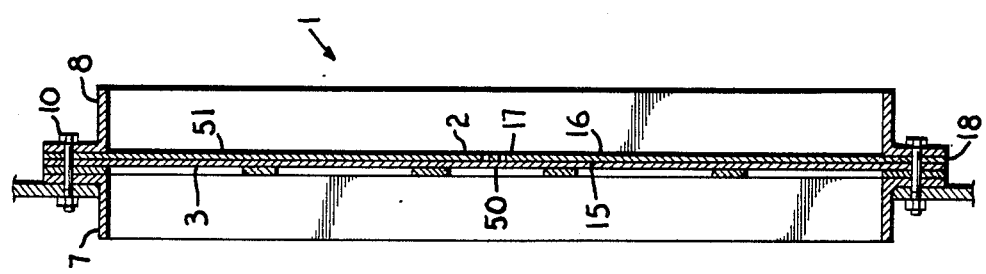
FIG. 4 is an enlarged, cross-sectional view of the vent panel taken along line 4—4 of FIG. 1 prior to rupture thereof.

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1, FIGS. 2 and 3, generally indicates a venting panel embodying this invention. The panel 1 includes a rupture body 2 having suitable lines of weakness for a predetermined burst path and opening and backed by a sealing membrane 3 of suitable material and character. The rupture body 2 and sealing membrane 3 are suitably associated with clamping flanges, gaskets and the like as described below to comprise the vent panel 1.

As shown in FIG. 1, the venting panel 1 is mounted in normally covering and closing relationship to an opening in a chamber or vessel, such as a bag house 4 or the like, subject to the build up of dangerously high pressures. The venting panel 1, whether used in a bag house 4 or other such chamber or vessel, in order to protect against overpressure, must reliably burst at a predetermined pressure differential between the atmosphere exterior to the vessel and its interior atmosphere and must not burst prior to reaching the designed pressure limit to prevent unnecessary loss of product or down time to change the vent panel. If the venting panel 1 were to prematurely rupture, polluting dust may also escape into the atmosphere in the case of a bag house and, in the case of a process vessel, valuable process gasses could be lost or the batch or process otherwise degraded or ruined.

For securing the rupture body 2 and sealing membrane 3 together and mounting same to the chamber or vessel, mounting structure 6 is provided such as oppositely extending flanged frame members 7 and 8 having fastening means extending around the periphery thereof, such as, in the illustrated example, apertures 9 for receiving bolts 10. In the illustrated example, the frame members 7 and 8 are rectangular in configuration and receive the rupture body 2 and sealing membrane 3 therebetween.

Referring to FIG. 2, the rupture body 2 is a relatively thin sheet structure of a medium impact strength polystyrene or a relatively soft metal, such as an aluminum alloy or a fully annealed stainless steel for resistance to corrosion by contact with an exterior atmosphere or process gasses. Preferably, the rupture body sheet is relatively thin, in the order of 0.005 inch, and with smooth opposite surfaces 15 and 16. The rupture body 2, in the illustrated example of FIG. 2, is likewise of rectangular configuration and is planar prior to use and bows very little prior to bursting (often less than one-half inch in a panel forty inches in length). The rupture body 2 has a central portion 17 and a peripheral margin 18, the margin 18 having a pattern of apertures 19 therethrough corresponding to the aperture pattern of the frame members 7 and 8 assembly. The peripheral margin 18 provides a clamping edge which is trapped between the frame members 7 and 8.

The rupture body 2 has a group of central apertures 21 extending through the central portion 17 thereof and in the illustrated example (see FIG. 6) includes a group of six bores or apertures 22, 23, 24, 25, 26 and 27 spaced in opposed and symmetrical, triangular patterns positioned slightly spaced from the immediate center 28 of the body 2. The apertures 24 and 25 are spaced from each other approximately 0.75 inches on a panel about forty inches in length and proportionately on other sizes of panels. The apertures 24 and 25 are also about equally spaced from apertures 22 and 23 and apertures 26 and 27 respectfully so as to form generally equilateral triangles therebetween.

A plurality of radially extending breaks or slits 29 extend through the rupture body 2. One of the slits 29 emanates from each of the apertures 22, 23, 26 and 27 and extend toward a respective corner 30 of the body 2, terminating short of the peripheral margin 18 so as to produce a series of leaves 35, four in number in the illustrated example, which divides the body 2 into segments.

As described below, the slits 29 separate, so that the leaves 35 open or spread outwardly, from one of the apertures 22, 23, 26 or 27 upon bursting of the rupture body 2 in order to equalize atmospheric pressure on the opposite sides of the vent panel 1 and allow venting of the chamber or vessel 4. Upon rupture, the leaves 35 remain attached near edges thereof to the main body 2 so as not to become dangerous projectiles upon bursting nor to separate from the panel 1 to clog or obstruct piping, conduit or other downstream structures.

As is best seen in FIG. 3, the slits 29 are discontinuous, and are divided into three segments 40, 41 and 42 with radially outer segments slightly shorter than inner segments. The segments 40, 41 and 42 are separated by bridges 44 and 45. Each of the segments 40, 41 and 42 terminate at a slightly larger circular bore or aperture 48 and one of the apertures 48 is on either side of each of the bridges 44 and 45. The bridges 44 and 45 are relatively short compared to the slit segments 40, 41 and 42 and tend to inhibit creep of the sealing member 3 through the slits 29 by urging the slits 29 not to substantially separate when pressure is applied to the panel 1.

The sealing membrane 3 in the illustrated example is a sheet of material of the same size and configuration as the rupture body 2 and is placed in planar surface-to-surface engagement therewith so as to engage surface 15. The sealing membrane 3 is a thin, foil like sheet material or membrane of a semi-elastic material displaying generally less than 20% of elongation in two inches at ambient temperature according to ASTM standards. Such a suitable material includes high density polyethelene, stainless steel and aluminum such as of 0.002 inch thickness which has been cold rolled to a half hard temper. Preferably, the sealing membrane 3 has a process resistant coating, such as a vinyl coating 50 on one surface thereof for exposure to the process and an adhesive coating 51 on the other surface for bonding engagement with surface portions of the rupture body 2. A suitable adhesive is a pressure sensitive acrylic.

The sealing membrane 3 covers the vessel side of the rupture body 2, at least in the area of the slits 29 and is suitably engaged therewith, as by bonding by the adhesive coating 51. In the illustrated example, the sealing membrane 3 and rupture body 2 are of identical size and the surface of the membrane 3 on either side of the slits 29 is coated with the adhesive whereby there is bonding engagement over the area of contact between the rupture body 2 and the sealing membrane 3 adjacent the slits 29.

Operably adjacent the sealing membrane 3 is a vacuum support 60. The support 60 includes a peripheral frame or rim 61 holding four equally spaced bars 62 extending from side to side which provides support to the rupture body 2 under conditions of vacuum or reverse pressure.

In operation and under application of pressure to the membrane side of the rupture body 2, the combined rupture body 2 and sealing membrane 3 tends to bulge slightly outwardly away from the high pressure side, for example approximately $\frac{3}{8}$ to $\frac{1}{2}$ of one inch. The bulging removes any slack from the combined or laminated body 2 and membrane 3, as the body 2 and membrane 3 are substantially thin, foil type sheets. Upon the application of pressure exceeding the design rupture limit of the body 2, there is a rapid tearing failure in the rupture body 2 emanating normally from either aperture 24 or 25 and rapidly extending to the opposite of the pair. The area of material between the apertures 22, 23, 26 and 27 and the apertures 24 and 25 tears quickly and the tears propagate outward along the slits 29 after which each of the leaves 35 spread outwardly, hinging on the peripheral portions of the body 2 and membrane 3 so that the leaves 35 remain connected to the remainder of the rupture body 2 adjacent the peripheral margin 18 and do not fragment or separate therefrom.

During the bulging stage of expansion and prior to rupture, the sealing membrane 3 protects the rupture body 2 from corrosive gasses and further, because of its low percent of elongation, resists expansion in the area of the slits 29 and the apertures 21 when pressure is applied to the rupture body 2, thereby resisting rupture of the membrane 3 up to the design rupture limit of the venting panel 1.

The rupture body 2 and sealing membrane 3 of the venting panel 1 may take different shapes, such as the illustrated rectangular shape, or may be square, round or triangular. Further, the rupture body 2 and sealing membrane 3 may assume different configurations other than the planar illustrated.

Shown in FIGS. 7, 8 and 9 is a modified embodiment of the vent panel according to the present invention which is generally designated by the reference numeral 101. The panel 101 is similar in some respects to the panel 1 in that it can be utilized with the same frame and to protect the same structures as the panel 1 and may be made of the same materials as the panel 1 except as noted.

The vent panel 101 comprises a rupture body 102 and a sealing member 103 adhered together over a substantial mating surface thereof. With reference to FIGS. 7 and 8, the body 102 is a relatively thin rectangular panel with a relatively large central aperture 105. Slits 110 extend radially outward from near the central aperture 105 to near a periphery 112 of the body 102. The slits 110 each include three segments 115, 116 and 117 separated by bridges 118 and 119 of much shorter length relative to the length of the segments. Each of the segments 115, 116 and 117 terminates at each end thereof in apertures 130 of substantially greater radius than the width of the slits 110. The apertures 130 are substantially smaller in diameter than the aperture 105.

An adhesive 133 bonds the body 102 to the sealing member 103 in at least close proximity and substantially entirely along the slits 110.

Reinforcing strips 138 are positioned between the body 102 and the sealing membrane 103. The strips 138 are substantially wider than the slits 110 and the apertures 130 and extend beneath essentially the entire length of the slits 110. The strips 138 tend to limit creepage of the sealing member 103 through the slits 110 when pressure is applied thereto. The strips 138 may be constructed from thin metal or plastic pieces.

The vent panel 101 functions similar to the panel 1 except that initial rupture normally propagates from the aperture 105 to one of the other closest apertures 130 and along the slits 110.

It is to be understood that while certain forms of the present invention have been illustrated and described herein, it is not to be limited to the specific forms or arrangement of parts described and shown.

What is claimed and desired to be secured by Letters Patent is as follows:

1. A low pressure venting panel comprising:
(a) a rupture body having a center, a peripheral margin and a central axis bisecting said rupture body and extending parallel a longer side of said rectangular rupture body;
  (1) said body having first and second apertures centrally positioned thereon, said first and second apertures being closely spaced from said center of said panel and being symmetrically disposed about said center and located on said axis;
  (2) said body having a plurality of slits extending between near said peripheral margin to near said center and being closely spaced from said first and second apertures; each of said slits being located near diagonals of said body and having bores positioned on each end thereof; and
(b) a sealing membrane bonded to said rupture body; said sealing membrane being bonded to said rupture body on near both sides of each of said slits; said sealing membrane being of a semi-elastic material and substantially resistant to expansion in the area of said slits.

2. A venting panel according to claim 1 wherein:
(a) each of said slits is divided into a plurality of segments of substantially greater length than width; a bridge is positioned between each of adjacent of said segments connecting said rupture body on opposite sides of said slits;
(b) each of said segments has bores on each end thereof, and wherein;
(c) said body is generally planar and rectangular and there are four of said slits.

3. A venting panel according to claim 2 wherein:
(a) each of said slits has with at least two of said bridges; and
(b) each of said segments is substantially longer than bridges adjacent thereto.

4. A venting panel according to claim 2 wherein:
(a) each of said slits includes a plurality of said segments each separated from one another by an associated bridge, and
(b) said bores are substantially greater in diameter than the width of said slit; the sides of said slit being in approximately touching relationship prior to application of pressure to said sealing membrane.

5. A venting panel according to claim 2 wherein:
(a) a pair of said slits is associated with each of said first and second apertures respectively and from a triangular configuration therewith with one of the apertures being at the apex of said triangular configuration.

6. A venting panel according to claim 2 including:
(a) a reinforcing strip for each of said slits; each of said strips extending substantially the length of said slits and being substantially wider than said slits; each of said strips being operably positioned between said body and said sealing membrane adjacent an associated slit.

7. A low pressure venting panel comprising:
(a) a substantially flat, rectangular rupture body having a center and a peripheral margin;
  (1) said body having four elongate slits therein; each of said slits being divided into a plurality of segments by bridges connecting said rupture body on opposite sides of a respective slit; said slits being located substantially near diagonals of said body; said slits terminating at one end substantially near said peripheral margin and terminating at an opposite end closely spaced from said center of said body;
(b) a sealing membrane bonded to said rupture body, said sealing membrane being bonded to said rupture body near and on both sides of each of said slits; said sealing membrane being of a semi-elastic material and being substantially resistant to expansion in the area of said slits.

8. A venting panel according to claim 7 wherein:
(a) each of said slits includes at least three segments each of said segments separated from adjacent segments by a bridge.

9. A venting panel according to claim 7 wherein:
(a) said body has a central aperture having a diameter substantially greater than the width of said slits; each of said slits being spaced from yet relatively close to said aperture and said slits radiating outward from said aperture so as to form a generally triangular configuration between any pair of adjacent slits and said aperture.

10. A low pressure venting panel comprising:
(a) a substantially flat, rectangular rupture body having a center, a central portion, a peripheral margin and a central axis bisecting said rupture body and extending parallel along a side of said retangular rupture body;
  (1) said rectangular rupture body having dimensions approximately proprotional to 40 inches by 24 inches;
  (2) said central portion having dimensions approximately proportional to 30 inches by 17 inches and having a center identical with said center of said rectangular rupture body;
  (3) said central portion having two apertures spaced approximately 0.75 inches apart in proportion to the dimensions in paragraph (a)(1) and being symmetrically disposed about said center of said panel; said apertures being positioned on said central axis;

(4) said central portion having four slits extending between near said peripheral margin and an area closely spaced from said apertures; each of said slits being located substantially along diagonals of said central portion and having bores on both ends;

(b) a sealing membrane bonded to said rupture body; said sealing membrane being bonded to said rupture body at least near both sides of said slits and substantially resistant to expansion in the area of said slits.

11. A venting panel according to claim 10 wherein:
(a) each of said slits is divided into segments by bridges connecting said rupture body on opposite sides of said slits between adjacent segments;
(b) each segment of said slits has bores on both ends thereof.

12. A venting panel according to claim 11 wherein:
(a) each of said slits includes at least three segments with a pair of bridges positioned between respective adjacent segments.

13. A venting panel according to claim 11 wherein:
(a) a vacuum support grid is positioned adjacent said sealing member and has a plurality of spaced openings therethrough to support said sealing member against vacuum pressure exerted thereon.

14. A venting panel comprising:
(a) a rupture body with at least one rupture directing slit therein;
(b) a sealing member adjacent said rupture body;
(c) said sealing member being bonded to said rupture body at least in close proximity to each side of said slit; and
(d) a protective strip operably positioned between said body and said sealing membrane; said strip being elongate and substantially wider than said slit; said strip being operably positioned adjacent said slit to help prevent said sealing member from creeping through said slit prior to rupture of said vent panel.

* * * * *